United States Patent
Kim et al.

(10) Patent No.: US 12,038,872 B2
(45) Date of Patent: Jul. 16, 2024

(54) APPARATUS AND METHOD FOR MANAGING IN-MEMORY CONTAINER STORAGE

(71) Applicant: ELECTRONICS AND TELECOMMUNICATIONS RESEARCH INSTITUTE, Daejeon (KR)

(72) Inventors: Dae-Won Kim, Daejeon (KR); Sun-Wook Kim, Daejeon (KR); Su-Min Jang, Daejeon (KR); Jae-Geun Cha, Daejeon (KR); Hyun-Hwa Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/842,957

(22) Filed: Jun. 17, 2022

(65) Prior Publication Data
US 2022/0405236 A1  Dec. 22, 2022

(30) Foreign Application Priority Data

Jun. 21, 2021 (KR) .................. 10-2021-0080305
May 26, 2022 (KR) .................. 10-2022-0064913

(51) Int. Cl.
G06F 16/20 (2019.01)
G06F 16/11 (2019.01)

(52) U.S. Cl.
CPC .................. *G06F 16/122* (2019.01)

(58) Field of Classification Search
None
See application file for complete search history.

(56) References Cited

U.S. PATENT DOCUMENTS

| | | | |
|---|---|---|---|
| 9,501,394 B2 | 11/2016 | Koh et al. | |
| 9,697,376 B2 | 7/2017 | Madanapalli et al. | |
| 10,783,121 B2 | 9/2020 | Brand | |
| 10,846,137 B2 | 11/2020 | Vallala et al. | |
| 11,327,686 B2 | 5/2022 | Kim et al. | |
| 2019/0179803 A1 | 6/2019 | Choi et al. | |
| 2021/0141836 A1 | 5/2021 | Byrne | |
| 2023/0080046 A1* | 3/2023 | Paul .................. G06F 16/188 707/822 |

FOREIGN PATENT DOCUMENTS

KR  10-2018-0068004 A  6/2018
KR  10-2021-0038285 A  4/2021

* cited by examiner

*Primary Examiner* — Belix M Ortiz Ditren
(74) *Attorney, Agent, or Firm* — LRK PATENT LAW FIRM

(57) ABSTRACT

Disclosed herein are an apparatus and method for managing in-memory container storage. The apparatus includes one or more processors, executable memory for storing at least one program executed by the one or more processors, and a container file system for storing a container, which provides application virtualization. Here, the container file system includes a merged access layer, a container layer, and an image layer, and the at least one program provides an application with link information of files in the container layer and the image layer, thereby allowing the application to access the files.

4 Claims, 10 Drawing Sheets

APPARATUS AND METHOD FOR MANAGING IN-MEMORY CONTAINER STORAGE

CROSS REFERENCE TO RELATED APPLICATIONS

This application claims the benefit of Korean Patent Application No. 10-2021-0080305, filed Jun. 21, 2021, and No. 10-2022-0064913, filed May 26, 2022, which are hereby incorporated by reference in their entireties into this application.

BACKGROUND OF THE INVENTION

1. Technical Field

The present invention relates generally to container-based solution technology, and more particularly to technology for managing in-memory container storage.

2. Description of the Related Art

With the development of cloud technology, interest in virtualization has increased, and hypervisor-based virtual-machine systems have promoted the development of cloud services. However, since container technology emerged as a new technology, IT vendors and cloud providers have been scrambling to launch container-based solutions. Container technology has become more popularized due to being selected as core technology in the open-source system known as "Kubernetes", and the Container Runtime Interface (CRI), which is a standardized interface for building a container-based runtime environment, has emerged.

A container generally operates on the system kernel of an Operating System (OS). In order to operate on the kernel, the container includes a part actually executed thereby and other parts.

A container is implemented using Linux namespaces and cgroup. A namespace virtualizes system resources, such as a filesystem or a network, for each container, and cgroup plays the role of limiting the amount of resources, such as a CPU and memory, available for each container. After setting namespace and cgroup, a low-level container runtime executes commands in the corresponding namespace and cgroup. Among such low-level container runtimes, runC is the most well-known container runtime. The function of runC is merely to execute an application. However, an API function related to images is additionally required in order to execute a container. As a container runtime for performing such a function, there is a container runtime called Docker-containerd. Like runC, containerd has also been developed in order to execute a container in Docker, and is provided in the form of a library. Kubernetes provides CRI in order to provide various container runtimes to developers such that the developers are able to concentrate on construction of a container runtime. A container autonomously provides memory in the form of storage and uses the same. To this end, a file system in the form of tmpfs is used, and this file system is used in order to speed up access to volatile memory, merely with the purpose of running a container. Storage used in the volatile memory is used to perform a single operation for simple calculation. This method has a disadvantage in that, although fast operation speed is provided, data is not capable of being permanently stored due to the characteristics of volatile memory.

In order to further improve the performance of a container, the container may be run in main memory. However, this method has a disadvantage in that a large amount of data is not capable of being stored due to the limited capacity of the main memory. The present invention proposes a container system residing in in-memory storage, which integrates main memory and disk storage, in order to overcome the disadvantage of the limited capacity of the main memory. Also, the present invention proposes a method for solving a system backup problem resulting from the volatile characteristics of storage using main memory and for processing data for fast operation.

Meanwhile, Korean Patent Application and Publication No. 10-2021-0038285, titled "Apparatus and method for managing integrated storage supporting hierarchical structure", discloses an apparatus and method for managing integrated storage that supports a hierarchical structure of cloud storage and non-cloud storage in a cloud-computing environment.

SUMMARY OF THE INVENTION

An object of the present invention is to configure an in-memory container and to manage a high-speed container platform.

Another object of the present invention is to store a container in in-memory storage in order to increase the speed of execution of the container, thereby increasing the execution speed.

A further object of the present invention is to overcome the limitations of memory using an extensible storage structure and to compensate for the volatile characteristics of memory using a backup/restore function based on a real-time backup environment.

Yet another object of the present invention is to support integrated management of all files and easy user access.

In order to accomplish the above objects, an apparatus for managing in-memory container storage according to an embodiment of the present invention includes one or more processors, executable memory for storing at least one program executed by the one or more processors, and a container file system for storing a container, which provides application virtualization. Here, the container file system includes a merged access layer, a container layer, and an image layer, and the at least one program provides an application with link information of files in the container layer and the image layer, thereby allowing the application to access the files.

Here, the apparatus may be connected with the in-memory container storage that stores the files, and the in-memory container storage may include memory, disk storage, and remote storage.

Here, the container file system may perform integrated processing of the layers using a unifying file-system function.

Here, the unifying file-system function may mount a user directory and relevant directories included in the layers of the container file system and perform integrated processing for the user directory and the relevant directories.

Here, the image layer may include a lower directory in which the link information is stored.

Here, the container layer may include an upper directory for storing difference information on update details of the image layer depending on access by a user.

Here, the merged access layer may include a user directory through which a file requested by a user to be shared is shared by accessing the link information of the image layer through the container layer.

Also, in order to accomplish the above objects, there is provided a method for managing in-memory container storage, performed by an apparatus for managing the in-memory container storage, according to an embodiment of the present invention. Here, the apparatus includes a container file system for storing a container, which provides application virtualization, and the container file system includes a merged access layer, a container layer, and an image layer. The method includes receiving a request to allocate the in-memory container storage from a user, allowing an application to access files by providing the application with link information of the files in the container layer and the image layer in response to the request from the user, and sharing the files using the link information.

Here, the image layer may include a lower directory in which the link information is stored.

Here, the container layer may include an upper directory for storing difference information on update details of the image layer depending on access by the user.

Here, the merged access layer may include a user directory through which the files requested by the user are shared by accessing the link information of the image layer through the container layer.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
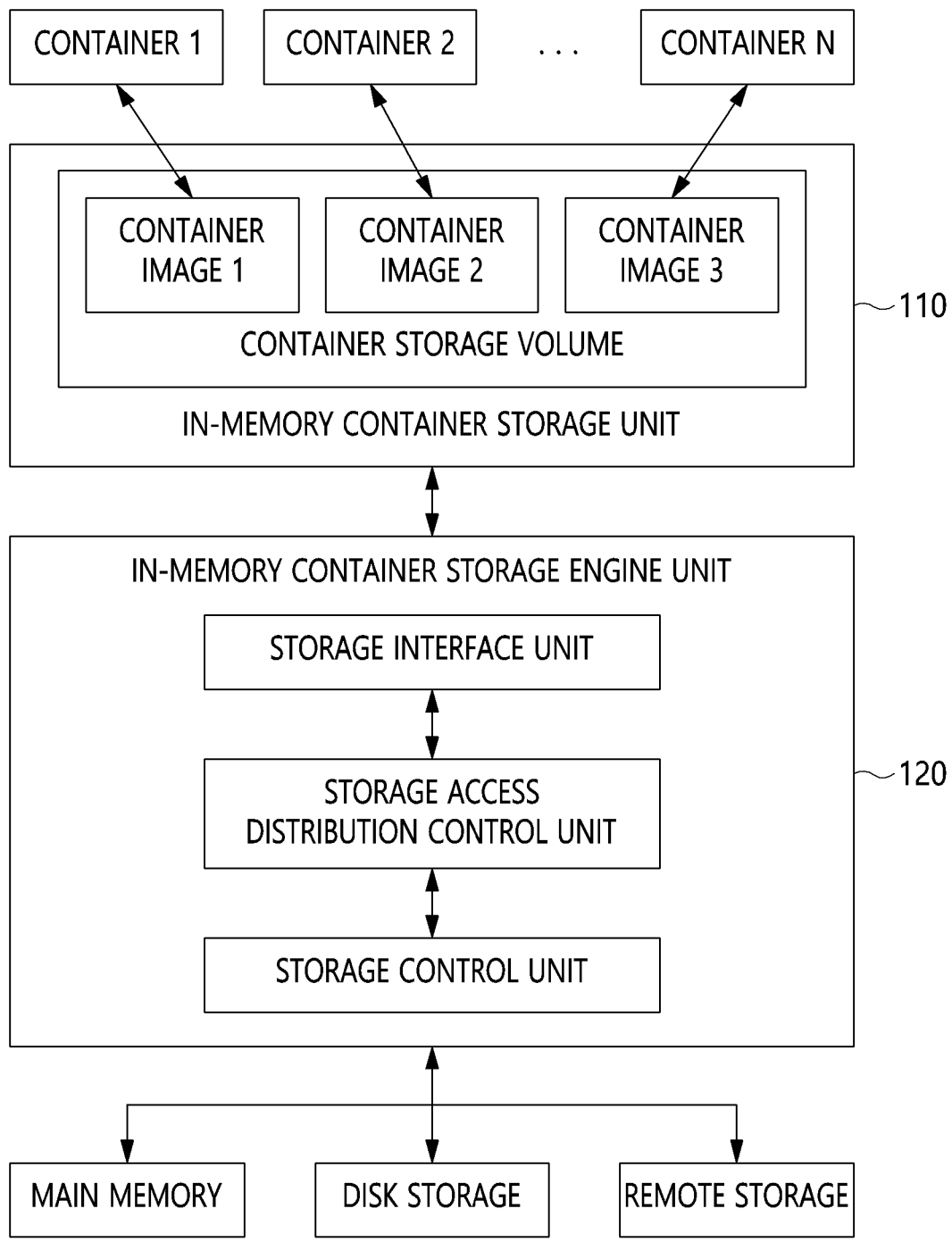
FIG. 1 and FIG. 2 are block diagrams illustrating an apparatus for managing in-memory container storage according to an embodiment of the present invention.

The present invention will be described in detail below with reference to the accompanying drawings. Repeated descriptions and descriptions of known functions and configurations that have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 2:
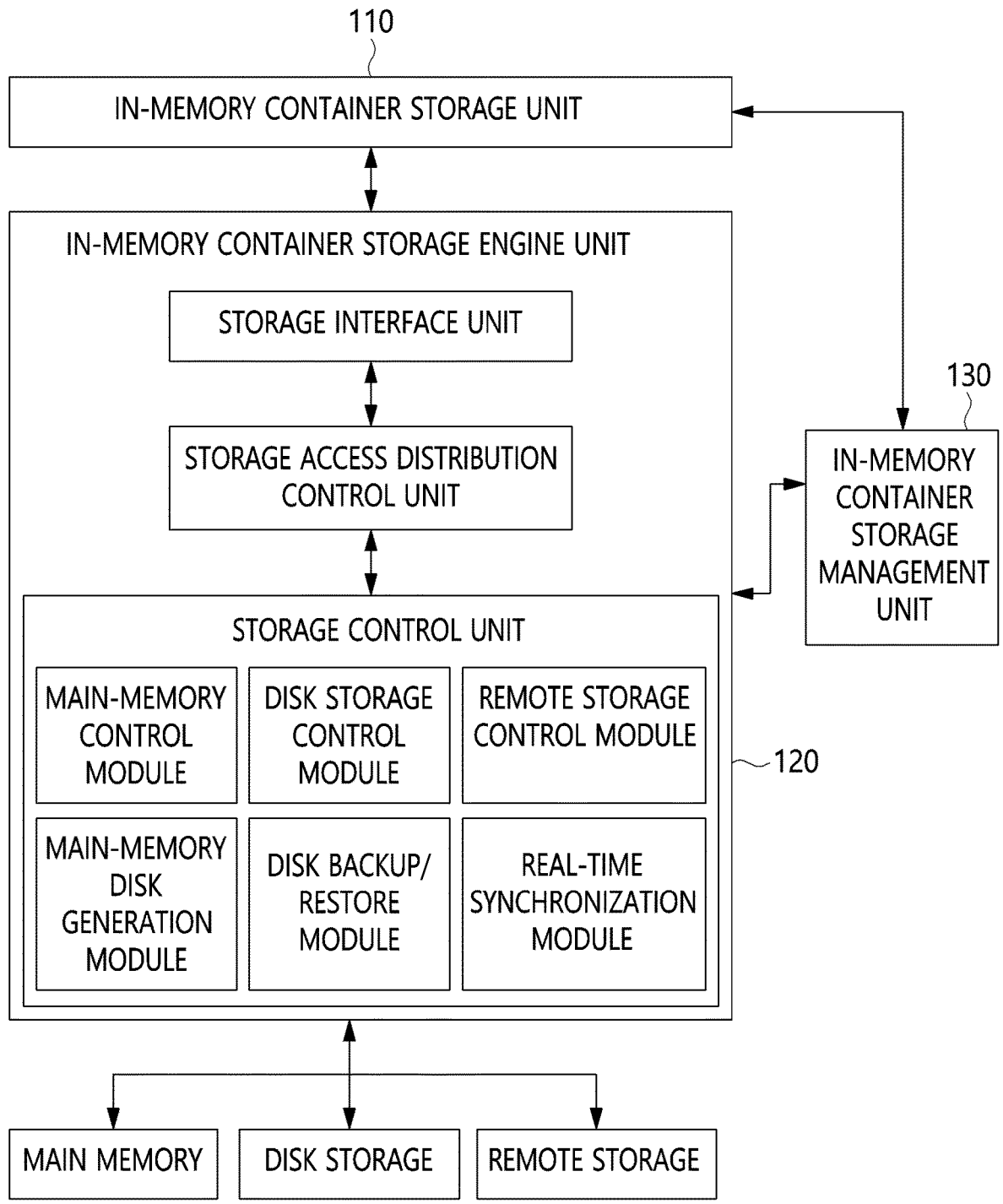

FIG. 1 and FIG. 2 are block diagrams illustrating an apparatus for managing in-memory container storage according to an embodiment of the present invention.

Referring to FIG. 1 and FIG. 2, the apparatus for managing in-memory container storage according to an embodiment of the present invention includes an in-memory container storage unit 110, an in-memory container storage engine unit 120, and an in-memory container storage management unit 130.

The in-memory container storage unit 110 generates container images from multiple containers, thereby generating a container storage volume.

Here, the in-memory container storage unit 110 may include storage in main memory, which has nonvolatile characteristics.

Here, the in-memory container storage unit 110 may generate a volume of a file system (e.g., /var/lib/docker in the case of Docker), in which a container is executed, and operate the same.

The in-memory container storage engine unit 120 may generate in-memory container storage, configured as a container storage volume appearing as a single storage unit, in the in-memory container storage unit 110 by integrating main memory, disk storage, and remote storage.

Here, the in-memory container storage engine unit 120 may include a container file system for storing a container, which provides application virtualization, and the container file system may include a merged access layer, a container layer, and an image layer.

Here, the container storage volume may include a merged access layer, a container layer, and an image layer, and may be configured as a container file system in which integrated processing of the respective layers is performed using a unifying file-system function.

Here, the container file system may perform integrated processing of the layers using the unifying file-system function.

Here, the unifying file-system function may mount a user directory and relevant directories included in the layers of the container file system and perform integrated processing of the user directory and the relevant directories.

Here, the image layer may include a lower directory in which link information is stored.

Here, the container layer may store difference information on update details of the image layer depending on access by a user.

Here, the merged access layer may include a user directory through which a file requested by the user to be shared is shared by accessing the link information of the image layer through the container layer.

Here, the in-memory container storage unit 110 provides a standard block storage interface, whereby an existing virtual system may be operated without modification.

The in-memory container storage unit 110 may receive a container access command generated in a container.

The in-memory container storage engine unit 120 may generate in-memory container storage appearing as a single storage unit by integrating main memory, disk storage, and remote storage.

The in-memory container storage engine unit 120 may process a disk access command using the main memory, the disk storage, and the remote storage in an integrated manner.

The in-memory container storage engine unit 120 may include a storage interface module, a storage access distribution module, and a storage control module.

The storage interface module may provide an interface of a standard block storage format and receive a disk access command generated in a container. The received command may be transferred to the storage access distribution module.

Depending on the characteristics of the disk access command, the storage access distribution module may determine whether to use main memory storage, disk storage, or remote storage in order to execute a service, and may transfer the access command to a main-memory control module, a disk storage control module, or a remote storage control module.

The main-memory control module may process the disk access command using main memory and provide high-speed access.

In response to disk access commands transferred in units of blocks, a main-memory disk generation module may perform actual read/write operations on the main memory, which is accessible by address. Accordingly, the main-memory disk generation module may store data of a virtual disk in the main memory.

The disk storage control module may process a virtual disk access command using disk storage.

The in-memory container storage management unit 130 may provide shared data to a user.

Here, the in-memory container storage management unit 130 may provide a sharing management function for shared storage through a container file-system layer management module, and may individually configure an area for file sharing and provide the same to a user.

Here, the in-memory container storage management unit 130 may provide an application with information about links to files in the container layer and the image layer in response to a request from the user, thereby allowing the application to access the files.

Figure 3:
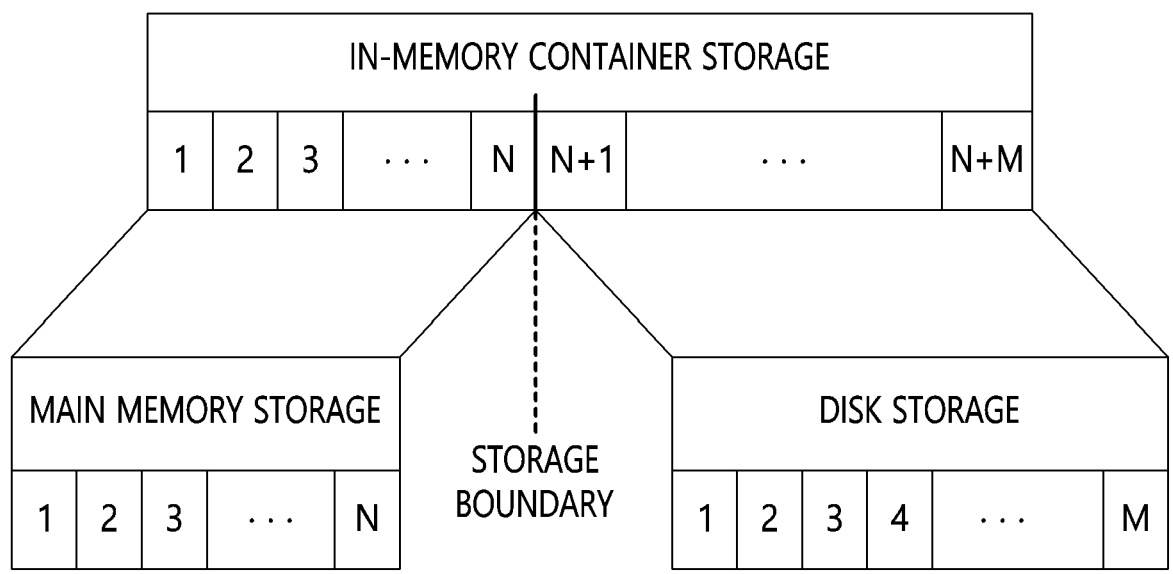
FIG. 3 is a view illustrating a process of generating in-memory container storage according to an embodiment of the present invention.

FIG. 3 is a view illustrating a process of generating in-memory container storage according to an embodiment of the present invention.

Referring to FIG. 3, it can be seen that a process of generating a single hybrid in-memory storage unit by integrating main memory storage and disk storage is illustrated. The in-memory container storage provides a standard block storage format, and it can be seen that a main memory storage area is mapped to the front part of the in-memory container storage and a disk storage area is mapped to the rear part thereof.

Block IDs 1 to N of the main memory storage are mapped to block IDs 1 to N of the in-memory container storage. Block IDs 1 to M of the disk storage are mapped to block IDs N+1 to N+M of the in-memory container storage. Also, a storage boundary is set between the block having an ID of N and the block having an ID of N+1 in the in-memory container storage.

Figure 4:
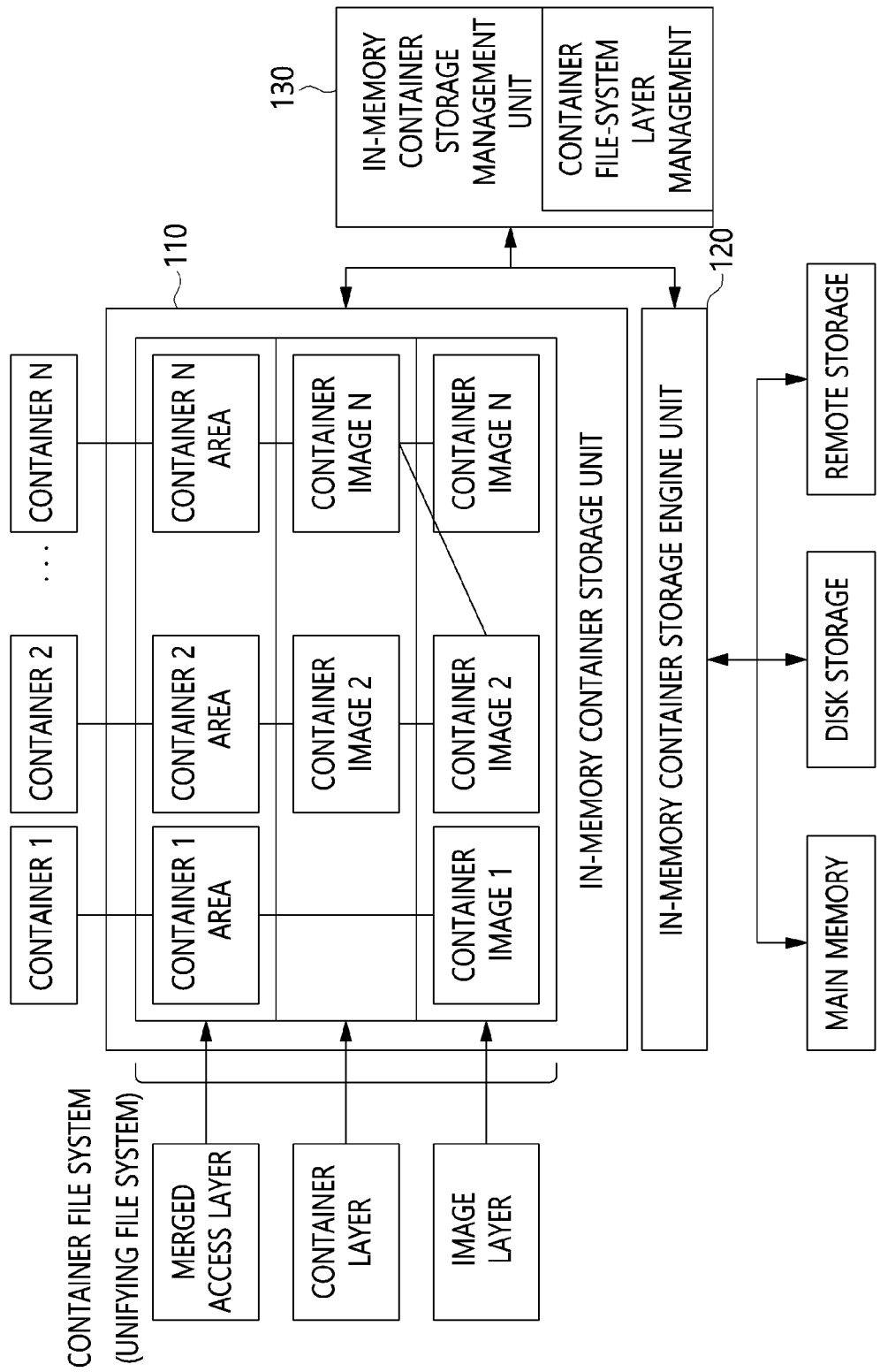
FIG. 4 is a block diagram illustrating a container file system implemented in in-memory storage according to an embodiment of the present invention.

FIG. 4 is a block diagram illustrating a container file system implemented in in-memory storage according to an embodiment of the present invention.

Referring to FIG. 4, it can be seen that a file system used in a container according to an embodiment of the present invention is illustrated.

In order to run a container in main memory, the basic file system of the container may be run in the main memory. In the case of a container, a file required by a user may be individually provided using a unifying file-system function included in the kernel of an existing Linux environment.

The unifying file-system function enables various file systems to be mounted at a single mount point, and enables all directory entries to be processed in an integrated manner in a virtual file system (VFS) layer, rather than generating a new type of file system. When the unifying file system is used, the directory entries of a lower file system are merged with the directory entries of an upper file system, and a logical combination of all of the mounted file systems may be generated. Accordingly, management of all of the file systems shared in the system and searching for a file may be locally performed, and file management for sharing is facilitated.

The container file system is configured using the unifying file-system function, and may be configured in a layered form. The container file system is configured with a merged access layer, a container layer, and an image layer. Each of the layers may operate by generating a specific directory in the in-memory container storage and being mounted in the same.

The container layer is configured as a writable layer, and is generated at the top layer in each container so as to have its own state. After a container is generated, a change in the container may be recorded in the container layer.

The read/write speed may be fast because read/write operations are performed in memory. Also, the container layer may include difference information between an actual image and a container image for efficient file management.

The image layer is a read-only layer, and may be shared with other containers. Also, an image shared with other layers may be operated as multiple images in the container layer.

The merged access layer stores a user directory, including link information of a layer accessible to all file systems of the container layer and the image layer, and shares the same with a user. Through this, the user may access files.

The image layer may improve the efficiency thereof by being shared with different systems. As shown in FIG. 4, a container image in the image layer is required to be pulled from a common repository (e.g., GitHub) when it is distributed.

Here, in order to guarantee the performance of a container image of the image layer, a method of locally storing the image used in the container system or fetching the same in advance is efficient. In the present invention, the pulled image may be stored in shared storage in order to reuse the same.

As described above, a number of images of the image layer resides in in-memory container storage, and container images of the entire system may be stored in disk storage or remote storage through backups.

Here, the stored container image may be added in the image layer. Accordingly, the image is also available in the container layer, and images may be continuously provided in the merged access layer.

Figure 5:
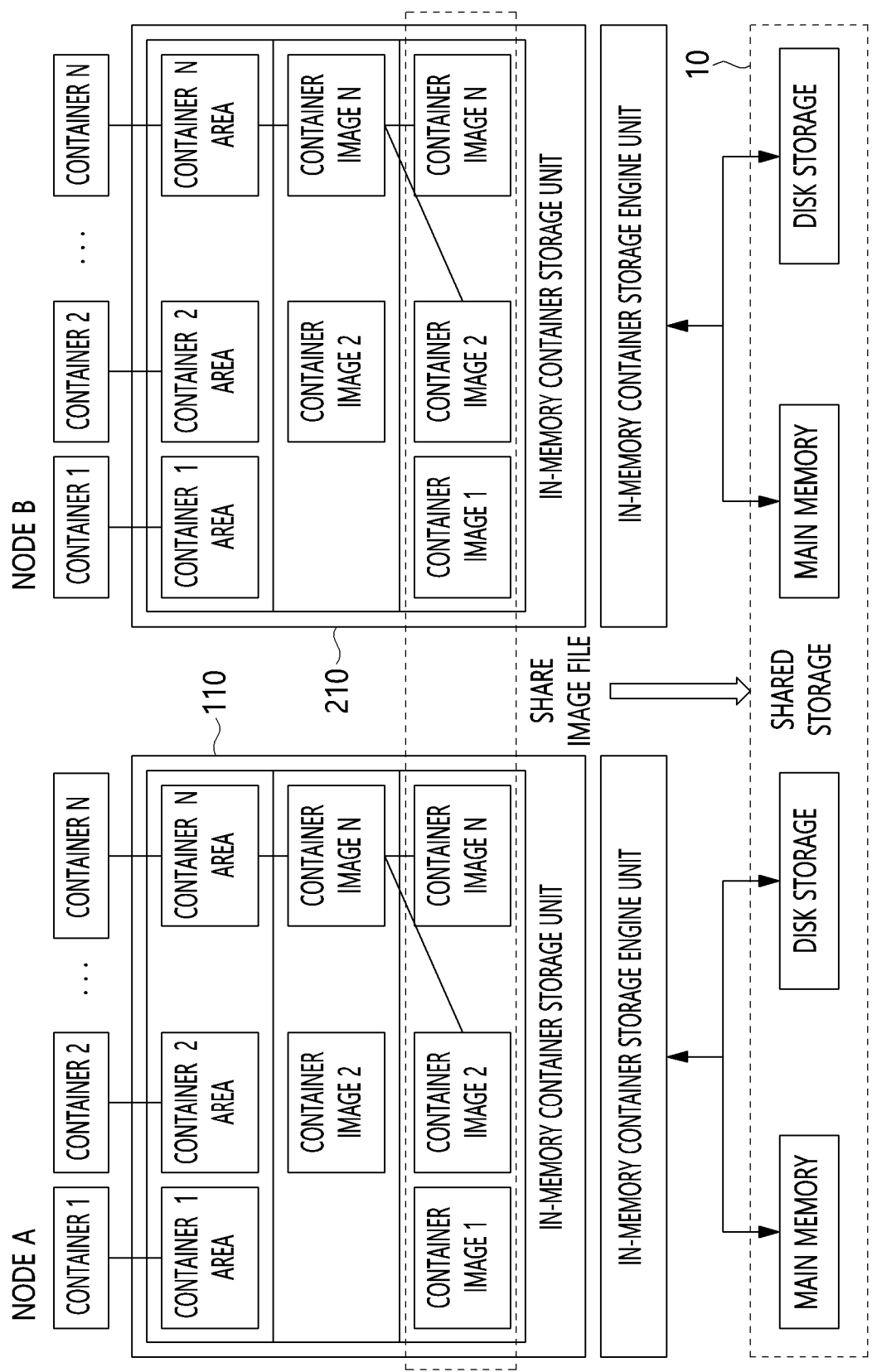
FIG. 5 is a view illustrating an image-sharing environment of in-memory container storage according to an embodiment of the present invention.

FIG. 5 is a view illustrating an image-sharing environment of in-memory container storage according to an embodiment of the present invention.

Referring to FIG. 5, it can be seen that the image-sharing environment of in-memory container storage according to an embodiment of the present invention is illustrated.

Shared storage may be network file storage (SAN, NAS, or the like) or storage connected to a local disk.

Here, a stored container image may be provided to a user in response to a request from the user.

The in-memory container storage management unit 130 may provide shared data to a user.

Here, the in-memory container storage management unit 130 may provide a sharing management function for the shared storage through a container file-system layer management module, and may individually configure an area for file sharing and provide the same to a user.

Figure 6:
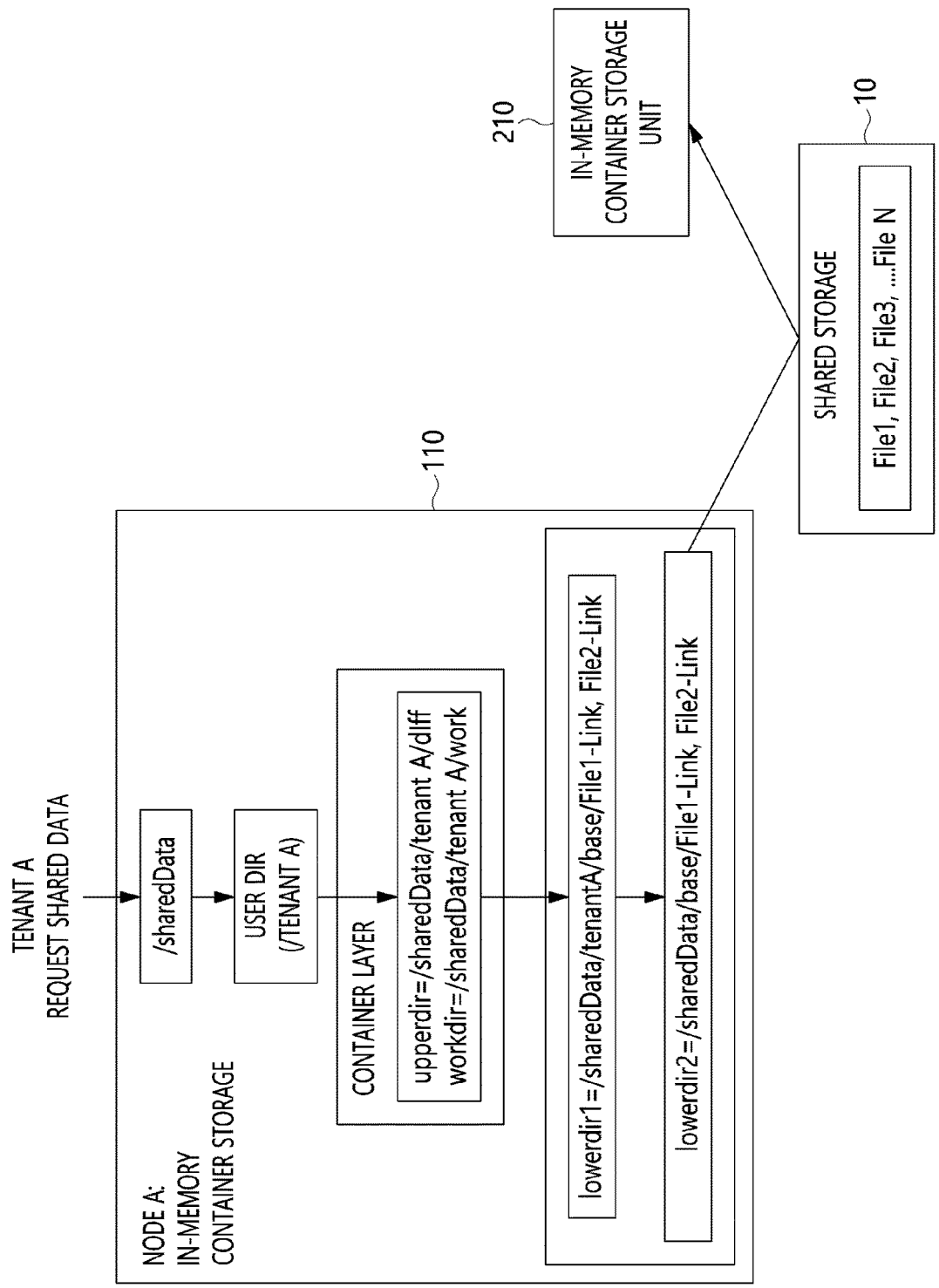
FIG. 6 is a view illustrating a user-sharing environment in a node having in-memory container storage according to an embodiment of the present invention.

FIG. 6 is a view illustrating a user-sharing environment in a node having in-memory container storage according to an embodiment of the present invention.

Referring to FIG. 6, it can be seen that a storage configuration for a user (tenant) in in-memory container storage and structures for a user-sharing environment in a node having in-memory container storage for providing shared data are illustrated.

The data-sharing method in the user-sharing environment illustrated in FIG. 6 provides a tenant access method such that data desired to be shared is sorted according to the group using shared data, rather than sharing all data, for security.

Here, a directory of a user (/sharedData/tenantA) is generated in response to a request from the user, and an upper directory is generated and mapped in the directory of the user (/sharedData/tenantA) as a container layer. Here, deduplicated user data may be used for file system management.

The upper directory, generated as the subdirectory of the directory of the user, is included in the container layer, and may store difference information on update details of the image layer for each user depending on access by the user. Also, a work directory may also be generated and mapped in the directory of the user. The work directory may correspond to the user data storage area of the container layer.

The image layer associates a first lower directory in the directory of the user (lowerdir1=/sharedData/tenantA/base/File1-Link, File2-Link) with the upper directory, whereby link information only for a file selected by the user, among the files stored in the shared storage, may be allocated therein.

Also, the image layer includes a second lower directory (lowerdir2=/sharedData/base/File1-Link, File2-Link, . . . , FileN-Link/), and the second lower directory, which is a management point for storing links to all files in the shared storage, may be set to the base directory of the shared storage (/sharedData/base). Also, the second lower directory may be exposed to the management system such that a user is able to select a necessary file for file management. Through this process, the user is able to view the file selected by the user through a subsystem.

In the merged access layer, a file requested by a user to be shared may be shared with the user through a user directory shared with the user, and the lower directories may always remain unchanged. That is, the lower directories may be read-only. This is an efficient method for preventing writing when the shared file is shared with multiple users.

Also, when files in the lower directories are changed, the change is recorded in the upper directory, which is efficient for overall management of the shared file.

Figure 7:
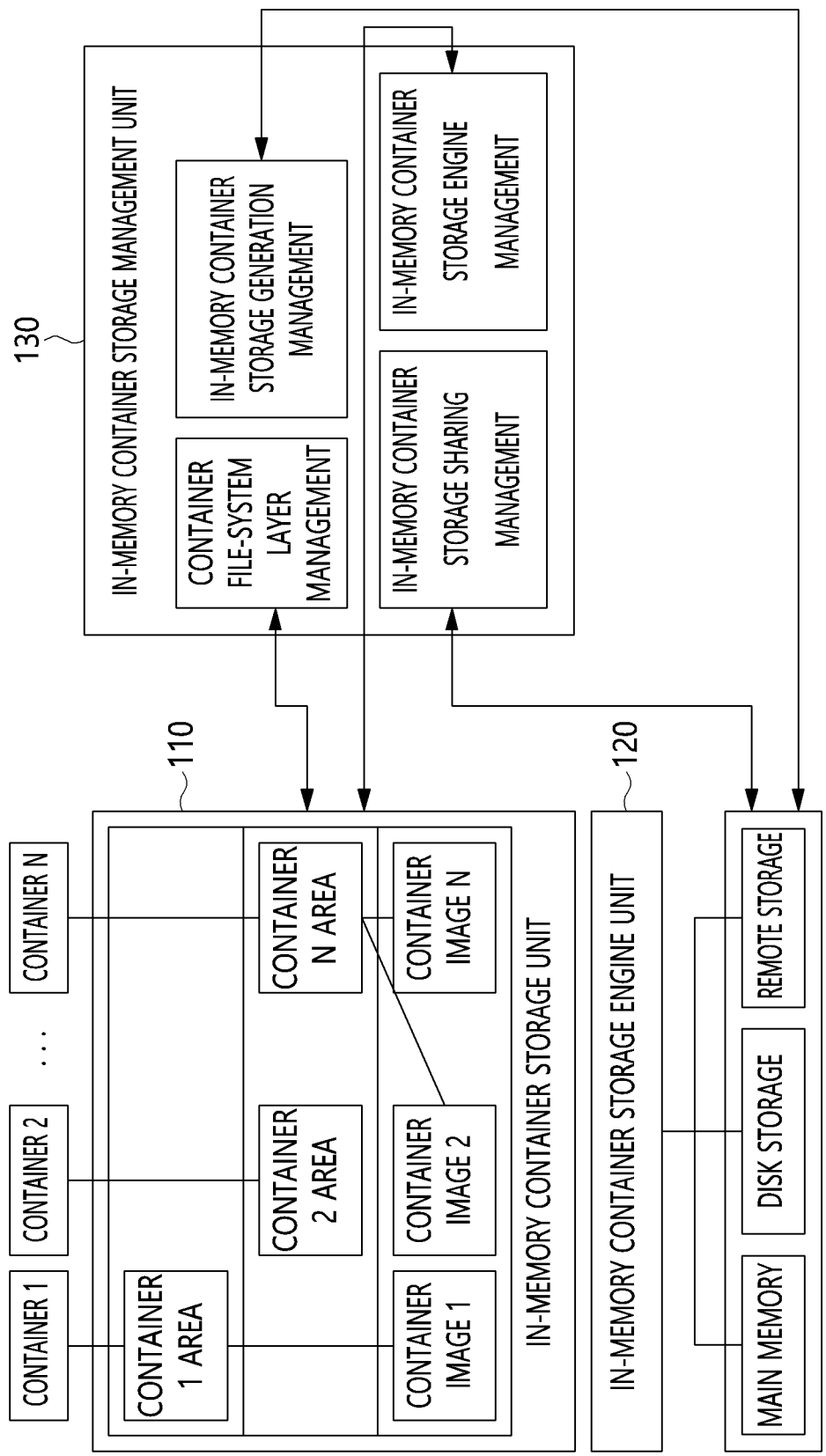
FIG. 7 is a block diagram illustrating in detail an example of the in-memory container storage management unit illustrated in FIG. 2.

FIG. 7 is a block diagram illustrating in detail an example of the in-memory container storage management unit illustrated in FIG. 2.

Referring to FIG. 7, the in-memory container storage management unit may include a container file-system layer management module, an in-memory container storage generation management module, an in-memory container storage sharing management module, and an in-memory container storage engine management module.

The container file-system layer management module may monitor the current state of a container file system and the state of execution thereof.

Here, the container file-system layer management module may manage generation of a container system and the state thereof when in-memory container storage is used.

The in-memory container storage generation management module may generate in-memory container storage when a container is configured to reside in memory in response to a request from a user.

Here, when in-memory container storage is generated by the in-memory container storage generation management module, the container file-system layer management module may generate a container file system of the system.

The in-memory container storage sharing management module may generate a file system to be shared among storage units and synchronize the same such that an image layer is shared in response to a request from a user.

Here, the in-memory container storage sharing management module may merge link information of the image layer into a single system and synchronize the same.

The in-memory container storage engine management module may generate and run an in-memory container storage driver of the system and monitor the state of the driver.

Figure 8:
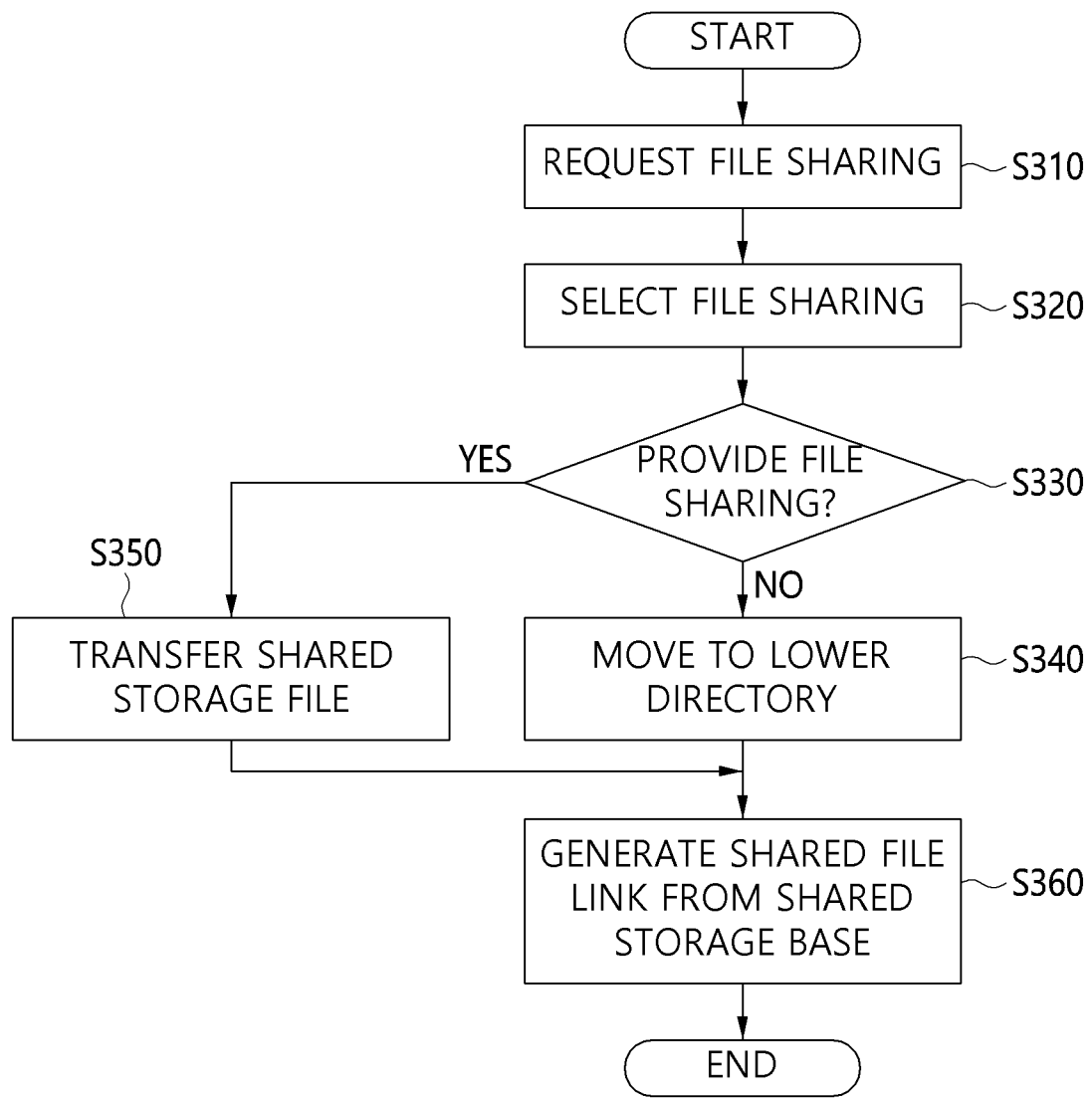
FIG. 8 is a flowchart illustrating a method for managing in-memory container storage according to an embodiment of the present invention.
Figure 9:
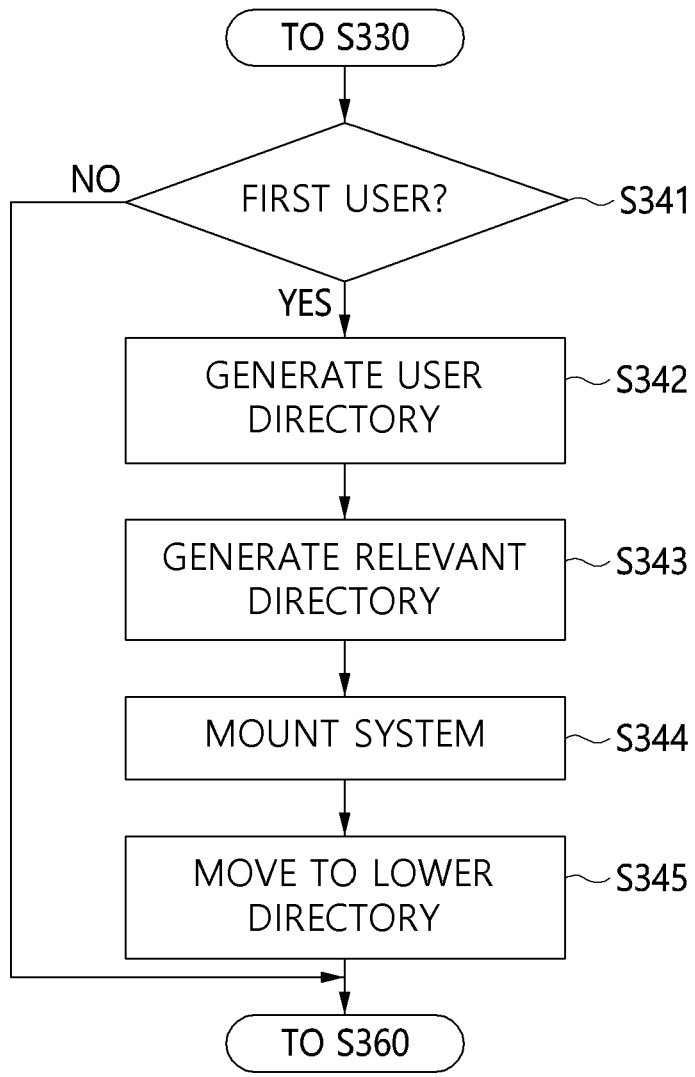
FIG. 9 is a flowchart illustrating in detail an example of the step of generating a directory illustrated in FIG. 8.

FIG. 8 is a flowchart illustrating a method for managing in-memory container storage according to an embodiment of the present invention. FIG. 9 is a flowchart illustrating in detail an example of the step of generating a directory illustrated in FIG. 8.

Referring to FIG. 8, in the method for managing in-memory container storage according to an embodiment of the present invention, first, a request to share a file in shared storage may be received from a user at step S310.

Here, at step S310, a user request for allocation of in-memory container storage may be received.

Here, an apparatus for managing in-memory container storage may include a container file system for storing a container, which provides application virtualization, and the container file system may include a merged access layer, a container layer, and an image layer.

Here, the image layer may include a lower directory in which link information is stored.

Here, the container layer may include an upper directory for storing difference information on update details of the image layer depending on access by the user.

Here, the merged access layer may include a user directory through which the files requested by the user are shared by accessing the link information of the image layer through the container layer.

Also, at step S320, the file to be shared may be selected by the user.

Also, at step S330, whether the user is a user to be provided with a file through sharing or a provider sharing a file may be checked.

Here, at step S330, when the user is a user to be provided with a file through sharing, the user moves to the lower directory at step S340, whereas when the user is a provider sharing a file, the user may transfer a file in shared storage at step S350.

Referring to FIG. 9, at step S340, whether the user is a first user may be checked at step S341.

Here, at step S340, when the user is a first user, a user directory is generated at step S342, relevant directories (upper, work, lower, and merged directories) are generated at step S343, the entire environment is mounted at step S344, and the user may move to the lower directory of the user at step S345.

Here, at step S340, when the user is not a first user, the user may immediately move to the lower directory in the previously generated directory of the user at step S345.

Also, at step S360, in the lower directory of the user, link information for the shared file, which is requested by the user to be shared, may be generated from the base directory of the shared storage.

Here, at step S360, the file requested by the user may be shared using the link information.

Also, at step S350, when the user is a provider sharing a file, the shared file in the shared storage for sharing may be uploaded to the user directory.

Here, at step S360, after moving to the base directory of the shared storage, link information for the shared file uploaded to the user directory may be generated.

That is, at step S360, in response to the request from the user, link information of the files in the container layer and the image layer is provided to an application, whereby the applications may be allowed to access the files.

The apparatus and method for managing in-memory container storage according to an embodiment of the present invention may integrate file systems and provide a container for sharing an image.

The apparatus and method for managing in-memory container storage according to an embodiment of the present invention may enable a number of applications to provide service to Cloud Service Customers (CSC), which are users, through a connection point (e.g., an IP address or URL) using a container.

The container file system of a container may be executed in a host storage device (main memory, an SSD, an HD, or the like). Here, the container may individually provide files required by a user using a unifying file-system function included in an existing kernel.

The unifying file-system function mounts various file systems at a single mount point, and integration of all directory entries may be performed in a virtual file-system (VFS) layer, rather than generating a new type of file system. The unifying file-system function merges the directory entries of a lower file system with the directory entries of an upper file system, thereby generating a logical combination of all of the mounted file systems. Accordingly, files in the entire file system shared in the system may be locally managed and searched, and file management for sharing may be facilitated.

The container file system described in the present invention is configured using a unifying file-system function, and may include multiple layers. The multiple layers may include a merged access layer, a container layer, and an image layer. The respective layers operate by being generated as specific directories in host storage and being mounted.

The container layer is a writable layer, and is generated at the top layer of each container such that the container has its own state.

Here, after a container is generated, all changes therein may be applied to the container layer.

The image layer is a read-only layer sharable with other containers. Also, multiple images shared with other layers may operate in the container layer.

The merged access layer includes link information of a layer accessible to all file systems of the container layer and the image layer, and may be shared with other containers.

Here, the merged access layer may enable access to a file in another container, which is shared through the link information of the layer.

The image layer may be shared with various systems in order to improve efficiency.

The image layer may fetch a container image from a public repository (e.g., GitHub) when the container is distributed.

Here, it may be efficient for the image layer to locally store the image used in the container system or to fetch the same in advance in order to guarantee performance. In the system of the present invention, the image pooled in shared storage may be reused in the shared storage.

As described above, images in the image layer reside in the container storage, and container images of the entire system may be stored in disk storage or remote storage through backups. When an image is added in the image layer as shared storage, it is also available in the container layer, and the image may be continuously provided from the merged access layer.

The present invention may provide an interface for using a container application. Here, the interface may include an IP address or a URL.

The present invention may provide container file-system management for high performance and high availability.

The container file system may be a file and directory system required for generating and executing a container including a container image.

The container file system is configured using a unifying file system, is easy to manage, and may provide high performance.

The layered file system may be configured with a merged access layer for access to all images and links, a container layer for generating a container, and an image layer for storing all images of a repository.

The respective layers may operate by generating specific directories in a host storage device and being mounted.

Here, the present invention may provide a container file system in a storage device using a unifying file-system function.

The storage device may include main memory, an SSD, an HD, NV Me, and integrated storage.

The integrated storage may include a main-memory connection block IO device driver, NV Me, and an SSD using a network interface.

The integrated storage may support high availability of the container file system.

The present invention may provide and manage a storage volume to be attached to a container in response to a user request.

The storage volume may include host file-system binding, a host storage device, or a host directory mount.

The present invention may provide a shared image in order to save storage resources.

The container image may be shared with other containers, and may be combined with other container images.

Management of the container file system may provide sharing of images between a repository and the layer (e.g., image layer) of the container file system.

The present invention may support a standard I/O interface in order to receive read/write commands.

Figure 10:
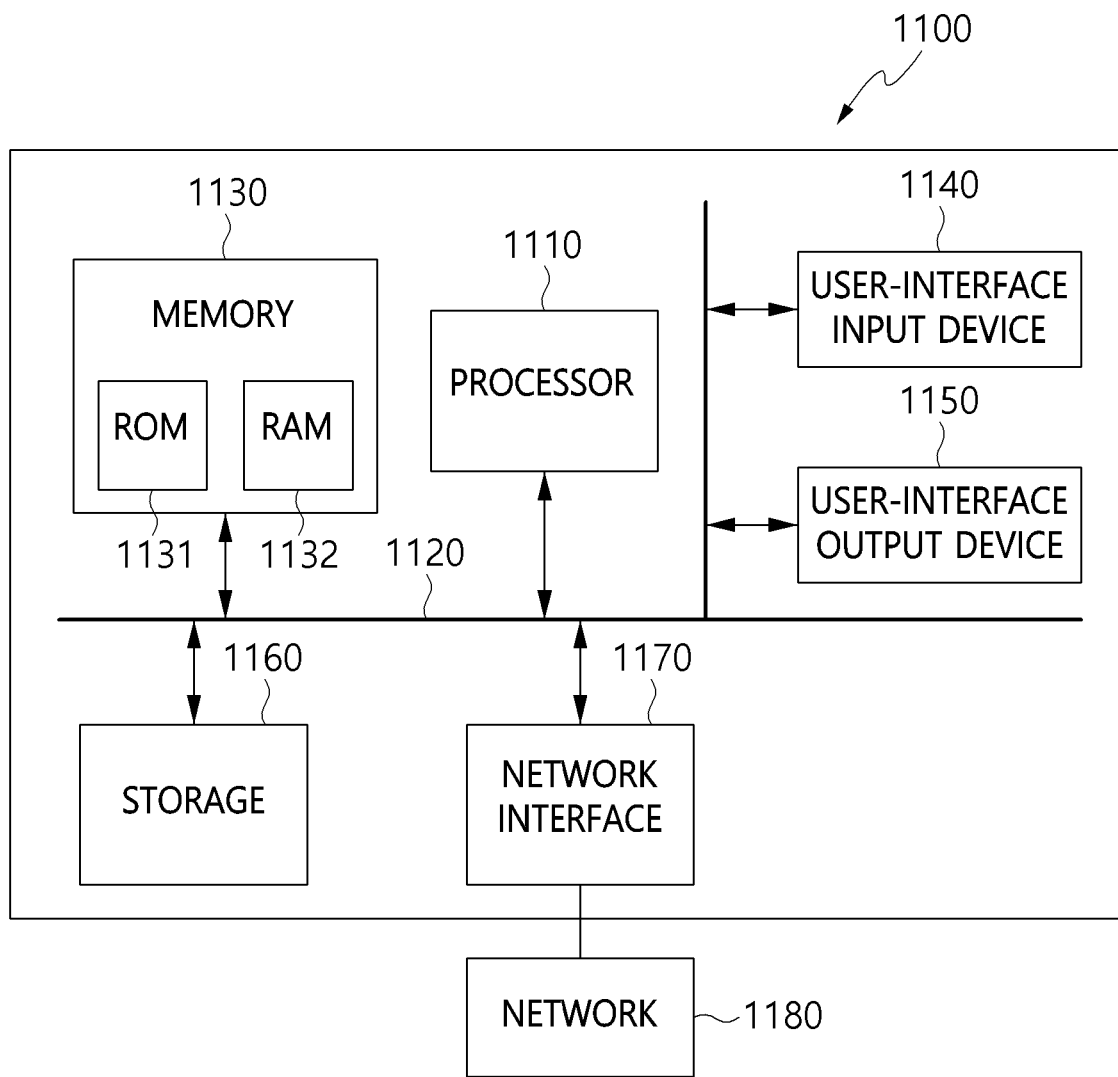
FIG. 10 is a view illustrating a computer system according to an embodiment of the present invention.

FIG. 10 is a view illustrating a computer system according to an embodiment of the present invention.

Referring to FIG. 10, the apparatus 100 for managing in-memory container storage according to an embodiment of the present invention may be implemented in a computer system 1100 including a computer-readable recording medium. As illustrated in FIG. 10, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

The apparatus for managing in-memory container storage according to an embodiment of the present invention includes one or more processors 1110, executable memory 1130 for storing at least one program executed by the one or more processors 1110, and a container file system for storing a container, which provides application virtualization. Here, the container file system includes a merged access layer, a container layer, and an image layer, and the at least one program provides an application with link information of files in the container layer and the image layer, thereby allowing the application to access the files.

Here, the apparatus for managing in-memory container storage is connected to the in-memory container storage for storing the files, and the in-memory container storage may include memory, disk storage, and remote storage.

Here, the container file system may perform integrated processing of the layers using a unifying file-system function.

Here, the unifying file-system function may mount a user directory and relevant directories included in the layers of the container file system and perform integrated processing of the user directory and the relevant directories.

Here, the image layer may include a lower directory in which the link information is stored.

Here, the container layer may include an upper directory for storing difference information on update details of the image layer depending on access by the user.

Here, the merged access layer may include a user directory through which a file requested by the user to be shared is shared by accessing the link information of the image layer through the container layer.

The present invention may manage a high-speed container platform by configuring an in-memory container.

Also, the present invention may store a container in in-memory storage in order to increase the speed of execution of the container, thereby increasing the execution speed.

Also, the present invention may overcome the limitations of memory using an extensible storage structure and compensate for the volatile characteristics of memory using a backup/restore function based on a real-time backup environment.

Also, the present invention may support integrated management of all files and easy user access.

As described above, the apparatus and method for managing in-memory container storage according to the present invention are not limitedly applied to the configurations and operations of the above-described embodiments, but all or some of the embodiments may be selectively combined and configured, so the embodiments may be modified in various ways.

What is claimed is:

1. An apparatus for managing in-memory container storage, comprising:
   one or more processors;
   executable memory for storing at least one program executed by the one or more processors; and
   a container file system for storing a container, which provides application virtualization,
   wherein the container file system includes a merged access layer, a container layer, and an image layer,
   the container file system provides an integrated storage where a block storage device, non-volatile memory express (NVMe), and Solid-State Drive (SSD) using a network interface are combined in a unifying file-system,
   wherein the merged access layer, the container layer, and the image layer are composed of a single directory,
   wherein container images from the merged access layer are mounted into the single directory from the container layer and the image layer,
   wherein the container layer provides the container images, thereby allowing an application to access the container images with read and write access rights,
   wherein the image layer provides the container images being shared with either the merged access layer or the container layer, thereby allowing the application to access the container images in the image layer with read-only access rights, and
   wherein the merged access layer provides link information of all the container images in the container layer and the image layer.

2. The apparatus of claim 1, wherein the container file system performs integrated processing of the layers using a unifying file-system function.

3. The apparatus of claim 1, wherein the container layer includes an upper directory for storing difference information on update details of the image layer depending on access by a user.

4. A method for managing in-memory container storage, performed by an apparatus for managing the in-memory container storage, comprising:
   receiving a request to allocate the in-memory container storage from a user;
   providing an application with link information of files in a container layer and an image layer in response to the request from the user, thereby allowing the application to access the files; and
   sharing the files using the link information,
   wherein:
   the apparatus includes a container file system for storing a container, which provides application virtualization,
   the container file system includes a merged access layer, the container layer, and the image layer,
   the container file system provides an integrated storage where a block storage device, non-volatile memory express (NVMe) and Solid-State Drive (SSD) using a network interface are combined in a unifying file-system,
   wherein the merged access layer, the container layer, and the image layer are composed of a single directory,
   wherein container images from the merged access layer are mounted into the single directory from the container layer and the image layer, wherein the container layer provides the container images, thereby allowing an application to access the container images with read and write access rights, wherein the image layer provides the container images being shared with either the merged access layer or the container layer, thereby allowing the application to access the container images in the image layer with read-only access rights, and wherein the merged access layer provides link information of all the container images in the container layer and the image layer.

\* \* \* \* \*